Figure 1:
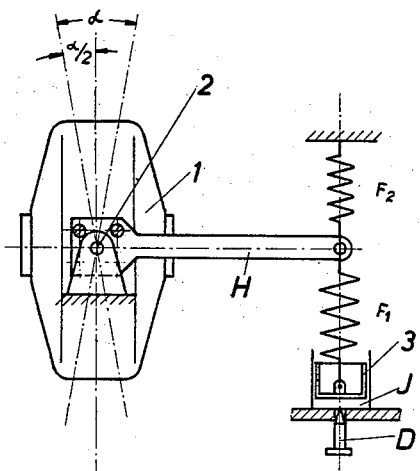

March 5, 1963 W. MÖLLER 3,079,803

FETTERED GYROSCOPE FOR FLIGHT CONTROL OF AIRBORNE OBJECTS

Filed Nov. 24, 1959

INVENTOR.
WALDEMAR MÖLLER
BY
ATTORNEY

3,079,803
Patented Mar. 5, 1963

3,079,803
FETTERED GYROSCOPE FOR FLIGHT CONTROL OF AIRBORNE OBJECTS
Waldemar Möller, Uberlingen (Bodensee), Germany, assignor to Bodenseewerk Perkin-Elmer & Co., G.m.b.H., Uberlingen (Bodensee), Germany
Filed Nov. 24, 1959, Ser. No. 855,100
Claims priority, application Germany July 2, 1959
5 Claims. (Cl. 74—5.5)

This invention is concerned with a fettered gyroscope for flight control of airborne objects. It is well known to fetter the precession axis of such a gyroscope by means of a spring, an air spring, for example. The spring is connected with a yielding integration device, e.g., an adjustable dashpot. The precession deflection of such a gyroscope is proportional to a value which is the summation of the angular velocity and the time integral of the angular velocity of rotation about the axis of sensitivity. Such integration gyroscopes are normally used for the purpose of stabilization of the axis of sensitivity. As is well known, a component of the angular velocity is used for damping the oscillations of the airborne object about its center of gravity. It is therefore necessary that this component of the angular velocity be syntonized to the stabilization frequency of the airborne object. This, however, can only be achieved with relatively strong fettering which, for example, may be so designed that the full amplitude of the precession deflection is reached at an angular velocity of 60°/sec., the effect of the integration device being neglected. Such a strongly fettered integration gyroscope is relatively insensitive with respect to slow speeds of revolution about the axis of sensitivity. It is therefore impossible without further difficulties to use such strongly fettered integration gyroscopes for control of the flight path. For this purpose, a gyroscope with less strong spring fettering is necessary. This fettering should be so designed, for example, that full precession deflection is reached at an angular velocity of 4°/sec.

The invention has therefore for its object, with such a strongly fettered gyroscope including an integration device, to provide a second fettering spring for the precession axis which is independent of said integration device and which is much softer than the first mentioned fettering spring. The hard spring element then becomes effective for the fettering of the gyroscope if the airborne object is subjected to rapid position oscillations with small amplitudes, while the soft spring element alone becomes determinative for the slow flight path oscillations with great amplitudes or for a stationary flight path turn.

With the apparatus of the invention, each of the two spring elements works within its respective range. The instrument provided by the invention is a gyroscopic turn indicator with two different ranges of measurement.

The soft fettering of the precession axis only becomes effective with slow flight path oscillations or with stationary turns. The hard fettering, due to its yielding integration device, becomes ineffective with such movements of the flying craft.

The spring constant of the soft fettering spring ("path spring") can be so designed that the deflection angle of the control surface controlled by the precession deflection of the gyroscope, corresponds to a desired angular velocity of flight path. Since, however, the deflection angle of the control surface for a definite angular velocity of flight path is variable during the flight and, in particular, depends on the atmospheric density, it has been found appropriate to provide for adjustability of the spring constant of the "path spring."

The object of the invention may be accomplished in an especially advantageous manner if an electric "spring" is used, at least for the soft fettering. The term "electric spring" is intended to designate an electric moment transmitter which is connected to an amplifier controlled by the precession deflection of the gyroscope. It is possible with such an "electric spring" to simply and conveniently adjust the spring constant or, if necessary under certain conditions, to switch the soft fettering spring on or off.

Two embodiments of the invention are illustrated in the accompanying drawings and more fully described in the following detailed description.

Figure 2:
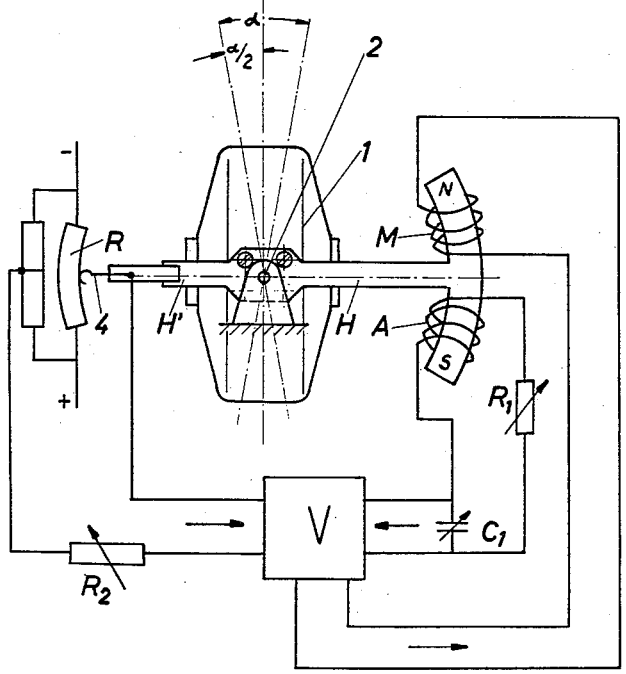

In the drawings:
FIG. 1 shows in schematic representation an integration gyroscope with mechanical fettering;
FIG. 2 shows as a further embodiment of the invention a schematic representation of an integration gyroscope with electric fettering.

In the embodiments selected for illustration, numeral 1 designates a gyroscope which is supported to oscillate about the precession axis 2. The gyroscope 1 carries a lever H the free end of which is in contact with a soft spring $F_2$ and a hard spring $F_1$ both of which fetter the lever H to its central position. The hard spring $F_1$ is supported by the piston 3 of a pneumatic integration device (or dashpot) J the permeability of which may be adjusted by means of the throttle valve D. As has already been suggested, spring $F_1$ may be replaced by an air cushion of variable volume situated beneath the piston 3 which then acts as an air spring.

With rapid rotary oscillations of the airborne object or flying craft (not represented in the drawings) about the axis of sensitivity of the gyroscope 1 it is essentially the relatively hard spring $F_1$ which is effective. This is because integration device J yields only slightly in the event of rapid precession movements of the lever H. With slow rotary movements, however, the effect of the spring $F_1$ practically vanishes because the integration instrument yields. A fettering moment is now exerted on the lever H by the soft spring $F_2$ which opposes the precession movement. In one embodiment spring $F_1$ is so designed that the full amplitude $$\frac{\alpha}{2}$$

of the precession deflection is reached at an angular velocity of 60°/sec. when the throttle D is fully closed. Spring $F_2$, on the other hand, is so designed that the amplitude $$\frac{\alpha}{2}$$

is reached at an angular velocity of 4°/sec. Thus, the gyroscope is relatively sensitive to slow rotary oscillations due to the weak fettering by spring $F_2$. With rapid rotary oscillations, however, it is relatively insensitive due to the strong fettering effected by spring $F_1$; but, on the other hand, is syntonized to the high stabilization frequency of the airborne craft.

With the embodiment shown in FIG. 2, a magnet NS is mounted at the free end of the lever H. The magnet NS cooperates, on the one hand, with a moment transmitter M and, on the other hand, with an inductive tap system A. The moment transmitter M is connected to an amplifier V which is controlled by the tap system A through an integration condenser $C_1$ and an adjustable resistance $R_1$.

If lever H performs a precession movement, a voltage is induced in the tap system A. After amplification in the amplifier V, this induced voltage reacts as a fettering force through moment transmitter M on lever H. It will be readily understood that with this "electric spring" the condenser $C_1$ corresponds to adjustment of the spring constant of $F_1$, while the resistance $R_1$ corresponds to the adjustable throttle valve D of the pneumatic integrator J.

A sliding contact 4 cooperating with the bridged resistance transmitter R is mounted on the extension H' of the lever H. The amplifier V is likewise controlled by the resistance transmitter R through an adjustable resistance $R_2$. In this manner, the soft fettering spring $F_2$ of the first embodiment is replaced by an "electric spring," the spring constant of which can be conveniently adjusted by means of the resistance $R_2$.

In the actual use of this invention, a position transmitter is arranged on the precession axis 2 to transmit signals corresponding to the precession deflections of the gyroscope 1. The signals are amplified and applied to the servo-unit of the control system of the controlled object.

I claim:

1. In a control device, an element tending to have a fixed angular position in space; lever means fixedly connected to said element for rotation therewith; first electrical restoring means in relatively soft damping relationship to said lever means; second electrical restoring means in relatively hard damping relationship to said lever means; and adjusting means in operative relationship with said second restoring means to cancel the damping effect thereof during relatively slow rotational movements of said lever means while permitting the damping effect during relatively rapid rotational movements of said lever means.

2. The apparatus of claim 1 wherein said lever means includes means for producing a first voltage proportional to angular rotation, means for producing a second voltage proportional to the velocity of said rotation, and means responsive to said first and second voltages to damp the movement of said lever.

3. A gyroscopic device having a rotor tending to maintain a fixed position in space; first signal producing means responsive to the precessional rotation of said rotor to produce a first electrical signal proportional to the amount of said rotation, said first signal producing means including variable impedance means and electrical pick-off means affixed to the housing of said rotor; second signal producing means responsive to the precessional rotation of said rotor to produce a second electrical signal proportional to the velocity of said rotation, said second signal producing means including variable impedence means, permanent magnet means affixed to the housing of said rotor, and electrical coil means in magnetic flux linking relationship with said permanent magnet means; and damping means responsive to said first and second electrical signals to dampen said precessional rotation.

4. The device of claim 3 wherein said damping means comprises amplifier means for amplifying said first and second electrical signals, electrical stator coil means in receiving relationship to the output of said amplfier means, and magnetically permeable means affixed to the housing of said rotor and in magnetic flux linking relationship with said stator coil means for actuation thereby.

5. The device of claim 4 wherein said permanent magnet means and said magnetically permeable means comprise opposite ends of a common magnet.

References Cited in the file of this patent

UNITED STATES PATENTS

| | | |
|---|---|---|
| 1,590,977 | Henderson | June 29, 1926 |
| 2,299,117 | Manteuffel | Oct. 20, 1942 |
| 2,345,169 | Wunsch et al. | Mar. 28, 1944 |
| 2,349,287 | Krussmann | May 23, 1944 |
| 2,569,676 | Kenyon | Oct. 2, 1951 |
| 2,795,957 | Muzzey | June 18, 1957 |
| 2,851,886 | Kuipers | Sept. 16, 1958 |
| 2,893,247 | Stern et al. | July 7, 1959 |

FOREIGN PATENTS

| | | |
|---|---|---|
| 1,166,699 | France | June 23, 1958 |